United States Patent [19]

Poorvin

[11] 3,882,466

[45] May 6, 1975

[54] SWITCHABLE FREQUENCY TONE DETECTOR WITH ELECTRONICALLY CONTROLLED CODE PLUG AND BCD CONVERTER

[75] Inventor: Ronald E. Poorvin, Plantation, Fla.

[73] Assignee: Motorola, Inc., Chicago, Ill.

[22] Filed: Oct. 12, 1973

[21] Appl. No.: 405,951

[52] U.S. Cl. ........ 340/171 PF; 340/171 R; 340/311

[51] Int. Cl. ........ H04q 1/45

[58] Field of Search .......... 340/171 PF, 171 R, 311, 340/312; 325/64; 329/105

[56] References Cited

UNITED STATES PATENTS 3,766,523 10/1973 Brocker ........................ 340/171 PF

*Primary Examiner*—Harold I. Pitts

*Attorney, Agent, or Firm*—Eugene R. Parsons; Vincent J. Rauner

[57] ABSTRACT

A switchable frequency tone detector for receiving and passing a plurality of tone signal frequencies in sequence. The tone detector includes an active filter having a number of switches each operative in response to one of a plurality of particular control signals to determine a particular one of the plurality of tone signal frequencies the active filter couples therethrough. A detector coupled to the output of the active filter operates in response to each of the tone signals in the sequence being coupled thereto to develop a particular sequence signal. An electronically controlled code plug coupled to the detector is operative in response to each particular sequence signal to develop a particular group of signals. This group of signals is coupled to a converter which is operative in response to each particular group of signals to develop one of the plurality of particular control signals and couple it to one of the switches.

9 Claims, 3 Drawing Figures

SWITCHABLE FREQUENCY TONE DETECTOR WITH ELECTRONICALLY CONTROLLED CODE PLUG AND BCD CONVERTER

BACKGROUND OF THE INVENTION

Switchable frequency tone detectors, employing switchable frequency active filters, are becoming quite popular in applications such as tone actuated paging receivers. An example of such a system is shown and described in U.S. Pat. Application Ser. No. 304,440, filed Nov. 7, 1972 by Alfred B. Wieczorek and Ronald E. Poorvin, now U.S. Pat. No. 3,803,429, and assigned to the same assignee as this application. It is desirable to be able to program the detector and filter in such a system to detect any one of a number of tone signals for each tone in the sequence. Furthermore, it is desirable to be capable of providing this plurality of tone signal selections for each tone signal in the sequence in response to a single detection signal for a prior tone in the sequence.

The detector of this application is commonly used in paging receivers. Because of the small size of such receivers, it is desirable to minimize the number of pins, terminals and wiring connections in this circuitry. This must be accomplished while still providing the above-noted number of tone selections for each tone in the sequence. It is even more desirable to be capable of changing the tone signal sequence without wiring changes in the unit, and by insertion and removal of an electronically controlled code plug.

Present day paging receivers are designed to operate from a one cell bettery. That is, they are designed to operate at 0.85 to 1.25 volts. The switchable active filter shown and described in the above-noted Wieczorek patent employs field effect transistors (FET) switches to switch the impedance elements which determine the frequency of the active filter. Field effect transistors are the best switches for this purpose, however, the voltage necessary to reduce the "on" channel resistance of a FET to an acceptable level in this usage is greater than one volt. A high voltage must be supplied to operate the switches, yet this must be supplied from a one cell battery. The voltage must, therefore, be supplied in a manner which minimizes the one cell battery current drain, and yet is consistent with the desire to minimize the number of pins, terminals, and wiring connections in the detector.

SUMMARY OF THE INVENTION

It is, therefore, an object of this invention to provide a switchable frequency tone detector capable of detecting any one of a number of tone signals for each tone in the sequence.

Another object of this invention is to provide a switchable frequency tone detector capable of providing a plurality of tone signal selections for each tone signal in the sequence in response to a single detection signal for a prior tone in the sequence.

Yet another object of this invention is to provide a switchable frequency tone detector requiring a minimum of pins, terminals and wiring connections in order to provide the abovenoted number of tone selections for each tone in a sequence.

A further object of this invention is to provide a switchable frequency tone detector employing an insertable and removable code plug which is electronically controllable for selecting the tones in the sequence.

A still further object of this invention is to provide a switchable frequency active filter and tone detector in a paging receiver which is operable from a one cell battery.

A yet further object of this invention is to provide a switchable frequency active filter and tone detector in a paging receiver employing FET switches operable at a voltage greater than a one cell battery and employing circuitry which minimizes the one cell battery current drain.

In practicing this invention, a switchable frequency tone detector is provided for receiving and passing a plurality of tone signals in sequence. The tone detector includes a switchable active filter which includes a plurality of field effect transistor switches, and impedance elements coupled to each of the field effect transistor switches. Particular ones of the field effect transistor switches are operative to conduct in response to one of a plurality of particular control signals of a first predetermined voltage, and couple the impedance element to the active filter for switching the active filter to one of the tone signal frequencies in the sequence. A detector, coupled to the output of the active filter, is operative in response to each of the tone signals in the sequence coupled thereto to develop a particular sequence signal. An electronically controlled code plug is coupled to the detector and operative in response to each of the particular sequence signals to develop a particular group of binary signals. A converter is coupled to the electronically controlled code plug and to the FET switches and is operative in response to each particular group of binary signals to develop one of the plurality of particular control signals for actuating one of the FET switches.

THE DRAWINGS

DETAILED DESCRIPTION OF THE PREFERRED EMBODIMENT

Figure 1:
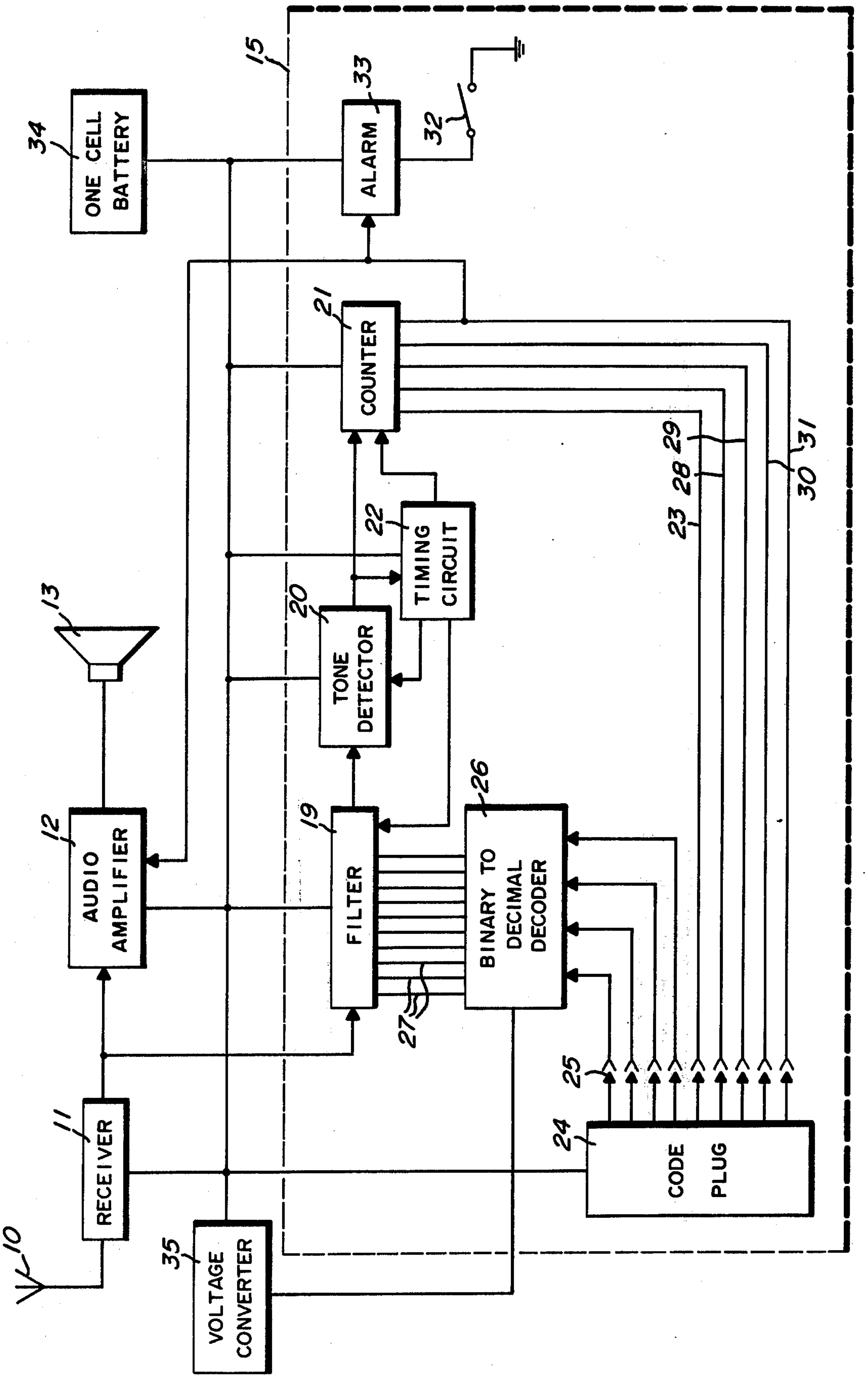
FIG. 1 is a block diagram of a selective signalling paging receiver employing the switchable frequency tone detector of this invention.

Referring to FIG. 1, radio frequency signals, modulated by audio frequency signals and predetermined tone signals are received at antenna 10 and coupled to receiver 11. Receiver 11 may be a standard double conversion FM receiver such as is well known in the art. The radio frequency signals are demodulated in receiver 11 and the predetermined tone signals and audio signals are coupled to audio amplifier 12. The amplified audio signals are reproduced by loudspeaker 13 which is coupled to audio amplifier 12.

A switchable frequency tone detector 15 is coupled to the discriminator of receiver 11 for receiving a particular number of predetermined tone signals in sequence. Tone detector 15 may include circuitry connected to audio amplifier 12, for maintaining audio amplifier 12 in an inoperative condition until the correct tone signal sequence has been detected by detector 15. Tone detector 15 then provides a selective squelch feature which allows the audio to be reproduced only upon receipt of the particular predetermined tone sequence for that receiver.

In the embodiment shown, five sequentially received, predetermined tone signals are necessary to cause the operation of tone detector 15. Each tone signal has a time period of 33 milliseconds. The first tone signal of the predetermined tone signal sequence is coupled from the discriminator of receiver 11 to active tone filter 19. Active filter 19 in the preferred embodiment is a hybrid circuit module. Active tone filter 19 is adjusted to have a center frequency corresponding to the first tone frequency via circuitry more fully described below. The first predetermined tone signal will be coupled through filter 19 to tone detector 20. If the tone signal is coupled to tone detector 20 for a predetermined time period, it will develop a detection signal. The detection signal is coupled to counter 21, causing the counter to change from a "1" to a "2" count. The detection signal is also coupled to timing circuit 22. Timing circuit 22 is more fully described in the above-noted Wieczorek, et al. U.S. Pat. application, and is a counter timer which resets upon receipt of an input signal and begins a new timing cycle.

The 2 count signal developed by counter 21 in response to the detection of the first tone signal is coupled via conductor 28 to code plug 24. Code plug 24 is an electronically controlled code plug hybrid circuit module which may be inserted into detector 15 via contacts 25 after the correct tone frequency sequence has been programmed therein. Code plug 24 will develop a 4 bit binary signal in response to the 2 count signal coupled thereto via line 28. This four bit binary signal defines in binary language a particular one of the plurality of tone signal frequencies of filter 19. As a four bit binary code is developed, it is possible to define any one of sixteen different tone signal frequencies in response to the 2 count signal coupled to code plug 24 via conductor 28. In the preferred embodiment, 12 different tones may be employed in the 5 tone sequence. Only 11 conductors are shown, however, because the 12th tone is produced by a fixed component in active filter 19.

The four bit binary code is coupled from code plug 24 to binary to decimal decoder and level shifter 26. Binary to decimal decoder and level shifter 26 is a level shifter and logic circuit which accepts the 4 bit binary signals coupled thereto from code plug 24 and first increases the voltage levels of these binary signals and their complements to a second predetermined voltage level. The increased voltage level binary signals are then coupled to logic circuits which are operative in response thereto to couple one of a plurality of particular control voltage signals to active filter 19 via one of conductors 27. Active filter 19 will respond to the voltage coupled thereto to change its center frequency to the frequency of the second tone in its predetermined tone sequence.

Tone signals 2, 3, 4 and 5 in the predetermined tone signal sequence are then sequentially received and coupled to tone detector 15 producing the same sequence of operation as described above with respect to the first tone. Counter 21 upon receipt of the second tone detection will register a "3" count which is coupled via conductor 29 to code plug 24. Upon receipt of the 3rd and 4th tone detection, a "4" and "5" count signal will be coupled to code plug 24 via conductors 30 and 31, respectively. Each count signal coupled to code plug 24 will cause it to develop a predetermined four bit binary signal corresponding to that count and couple that group of 4 binary signals to binary to decimal decoder and level shifter 26. Binary to decimal decoder and level shifter 26 will respond to each four bit binary signal group to develop a control voltage signal of a first predetermined voltage level on one of conductors 27 and couple that signal to active filter 19 to change its center frequency to the frequency of the next succeeding tone in the predetermined tone sequence.

When the 5th tone in the tone signal sequence is detected, counter 21 will develop a zero count which will be coupled to alarm 30 for producing an audio alerting signal. This 0 count will also be coupled to audio amplifier 12, allowing amplifier 12 to amplify the audio signals and couple them to speaker 13 for reproduction.

When the message is completed, the user may actuate reset switch 32. Reset switch 32 causes counter 21 to be reset to a "1" count, and terminates the audio alerting signal from alarm 33. If the user does not manually reset the unit after counter 21 reaches the 0 count, timing circuit 22 will develop a second timing signal 45 milliseconds after the 0 count occurs. The second timing signal is coupled to counter 21, causing counter 21 to reset to a 1 count.

This 1 count will be coupled to code plug 24 via conductor 23 causing code plug 24 to develop a four bit binary signal corresponding to that count. These signals again are coupled to binary to decimal decoder and level shifter 26. Binary to decimal decoder and level shifter 26 will develop a control voltage signal on one of leads 27 in response to the 4 binary bits. This control voltage signal when coupled to switchable active filter 19 will cause it to change its center frequency to the frequency of the first tone in its predetermined tone sequence, thus resetting the unit for another call.

A one cell bettery 34, is shown in FIG. 1 coupled to a majority of stages of the paging receiver. One cell battery 34 is coupled to receiver 11, audio amplifier 12, switchable active filter 19, tone detector 20, counter 21, alarm circuit 33 and code plug 24. One cell battery 34 provides a voltage to the above-noted stages which varies from 0.8 volts to 1.25 volts depending upon the state of charge of the one cell battery. One cell battery 34 is also coupled to a voltage converter 35. Voltage converter 35 may be any type converter commonly known to those skilled in the art. For example, it may be a voltage doubler. Its function is to provide an output voltage which is always greater than 1.5 volts in response to the voltage supplied by one cell battery 34. The output of voltage converter 35 is coupled to binary to decimal decoder and level shifter 26.

Figure 2:
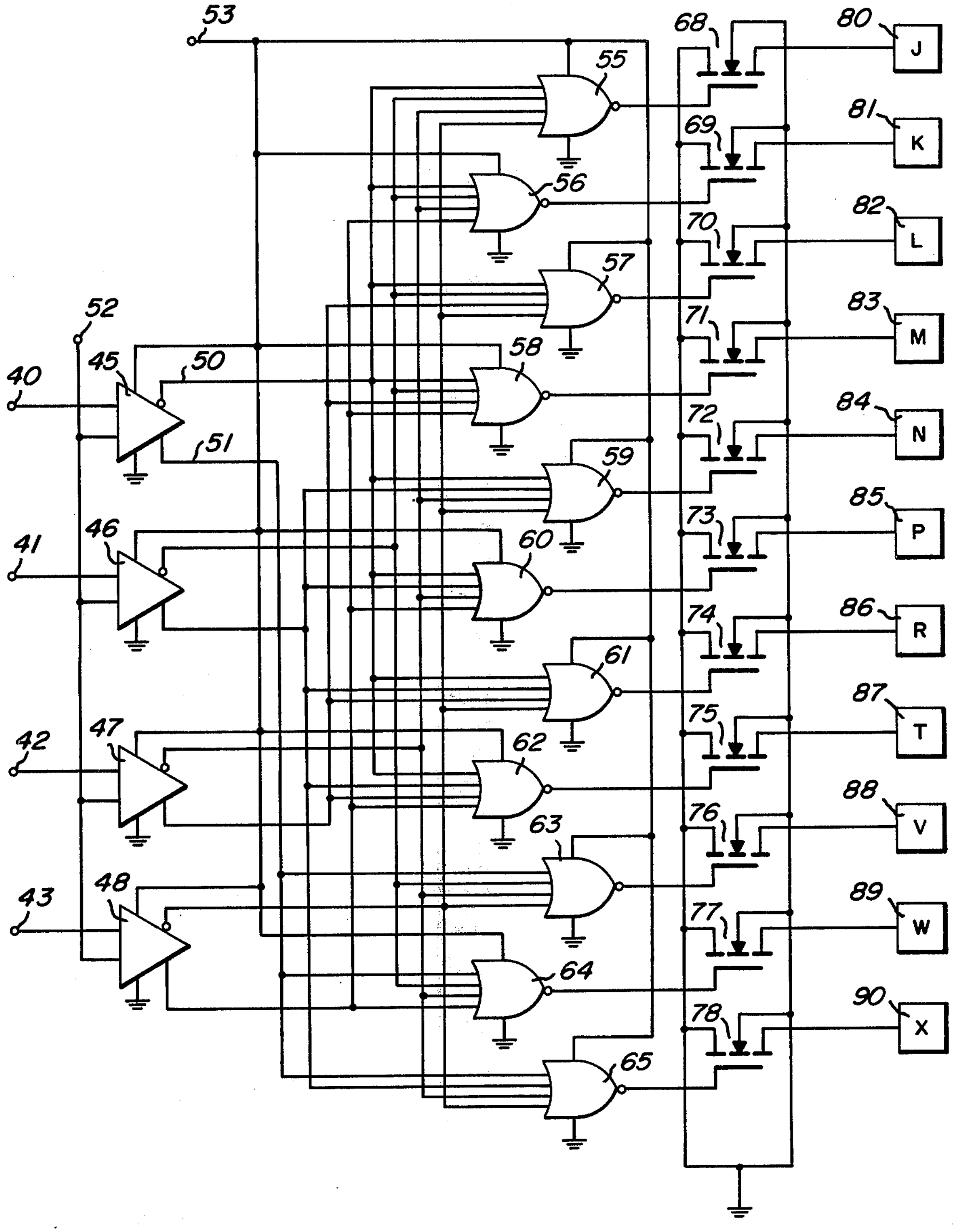
FIG. 2 is a partial schematic and partial logic block diagram of the binary to decimal decoder in the portion of the switchable active filter shown in FIG. 1.

Referring to FIG. 2, binary to decimal decoder and level shifter 26 is shown in greater detail. In the preferred embodiment, decoder and level shifter 26 is a part of the hybrid circuit module containing active filter 19. The binary signals from code plug 24 are coupled to input terminals 40, 41, 42 and 43 of level shifters 45, 46, 47 and 48, respectively. Each level shifter has two outputs. An inverted output, shown by a little circle adjacent the triangle of amplifier 45 and identified as 50; and a non-inverted output shown as 51. Each of the remaining level shifters has an inverted and a non-inverted output identified in the same manner as shown with respect to level shifter 45. Level shifters 45 through 48 in the preferred embodiment employ field effect transistors (FETs) in order to minimize the power and current requirements so as to allow usage in a paging receiver. The level shifters employed herein are more fully shown and described in U.S. Pat. Application Ser. No. 297,547, filed Oct. 13, 1972 and assigned to the same assignee as this application, now U.S. Pat. No. 3,801,831. The battery voltage from one cell battery 34 is coupled to terminal 52 and the higher voltage from voltage converter 35 is coupled to input terminal 53. The binary input signals coupled to terminals 40 through 43 shift in voltage between ground and the maximum voltage of one cell battery 34. The binary output signals developed on the inverted and non-inverted outputs of each of level shifters 45 through 48 shift in voltage level between the voltage supplied at terminal 53 and ground potential. The output signals developed by level shifters 45 through 48 are therefore at a first predetermined voltage level, greater than the voltage level of a one cell battery and the second predetermined voltage level of the binary input signals applied to the level shifters. The inverted and non-inverted outputs of amplifiers 45 through 48 are coupled to particular inputs of NOR gates 55 through 65. For example, the inverted output 50 of level shifter 45 is coupled to one input of NOR gates 55, 56, 57, 58, 59, 60, 61 and 62. The non-inverted output of level shifter 45 is coupled to one input of NOR gates 63, 64 and 65.

When a particular group of binary signals is coupled to input terminals 40 through 43, the interconnection of level shifters 45 through 48 and NOR gates 55 through 65 will cause one of NOR gates 55 through 65 to develop an output signal. The voltage level of the output signal is directly related to the voltage level of the input signal and the voltage supplied to each NOR gate from terminal 53. In the preferred embodiment, the higher voltage level of voltage converter 35 is coupled to the NOR gates 55 through 65, as is the second predetermined voltage level from level shifters 45 through 48. The voltage at the output of the activated NOR gate, referred to as the control voltage, will, therefore, be in excess of 1.5 volts. Again, as with the level shifters NOR gates 55 through 65, are FETs in order to minimize the power and current drain requirements for use with the paging receiver.

Each output of NOR gate 55 through 65 is coupled to a gate electrode of FETs 68 through 78. FETs 68 through 78 are the transistor switches located in active filter 19. They are more clearly shown and described in the above-noted Wieczorek, et al. U.S. Pat. 3,803,429. Each drain electrode 80 through 90 of FET switches 68 through 78 is connected to a resistance as shown in the above-noted Wieczorek, et al. patent. When one of NOR gates 55 through 65 turns on, that is, switches from a low to a high state, a control voltage of the first predetermined voltage level and in excess of 1.5 volts is coupled to the gate electrode of the FET switch 68 through 78 associated with that NOR gate. The signal will cause the FET switch to turn on and couple the resistance coupled to its drain electrode to active filter 19, causing active filter 19 to switch to a frequency determined by the impedance connected to the drain electrode of that field effect transistor switch.

Field effect transistor switches 75 through 78, when switched to an on state, must have an impedance less than approximately 150 ohms in order to prevent the FET switch impedance from seriously affecting the frequency to which active filter 19 is tuned. In order to minimize the channel on-resistance of FETs 75 through 78, a voltage in excess of 1.5 volts must be coupled to the drain of the field effect transistor switch when it is turned on. It is to provide this voltage in excess of 1.5 volts that level shifters 45 through 48 are provided. Furthermore, in order to provide this higher voltage while still operating from one cell battery 34, level shifters 45 through 48 and NOR gates 55 through 65 employ FETs arranged so as to minimize power and current drain requirements.

Field effect transistor switches 68 through 74, when switched to an on state, may have a higher impedance in the preferred embodiment. This is because the frequencies to which active filter 19 is switched in response to operation of switches 68 through 74 are much lower. This lower frequency operation is not seriously affected by a higher impedance due to the transistor switches. In order, however, to provide uniformity, minimize external components and allow fabrication in integrated circuit form, switches 68 through 74 are identical to switches 74 through 78.

Figure 3:
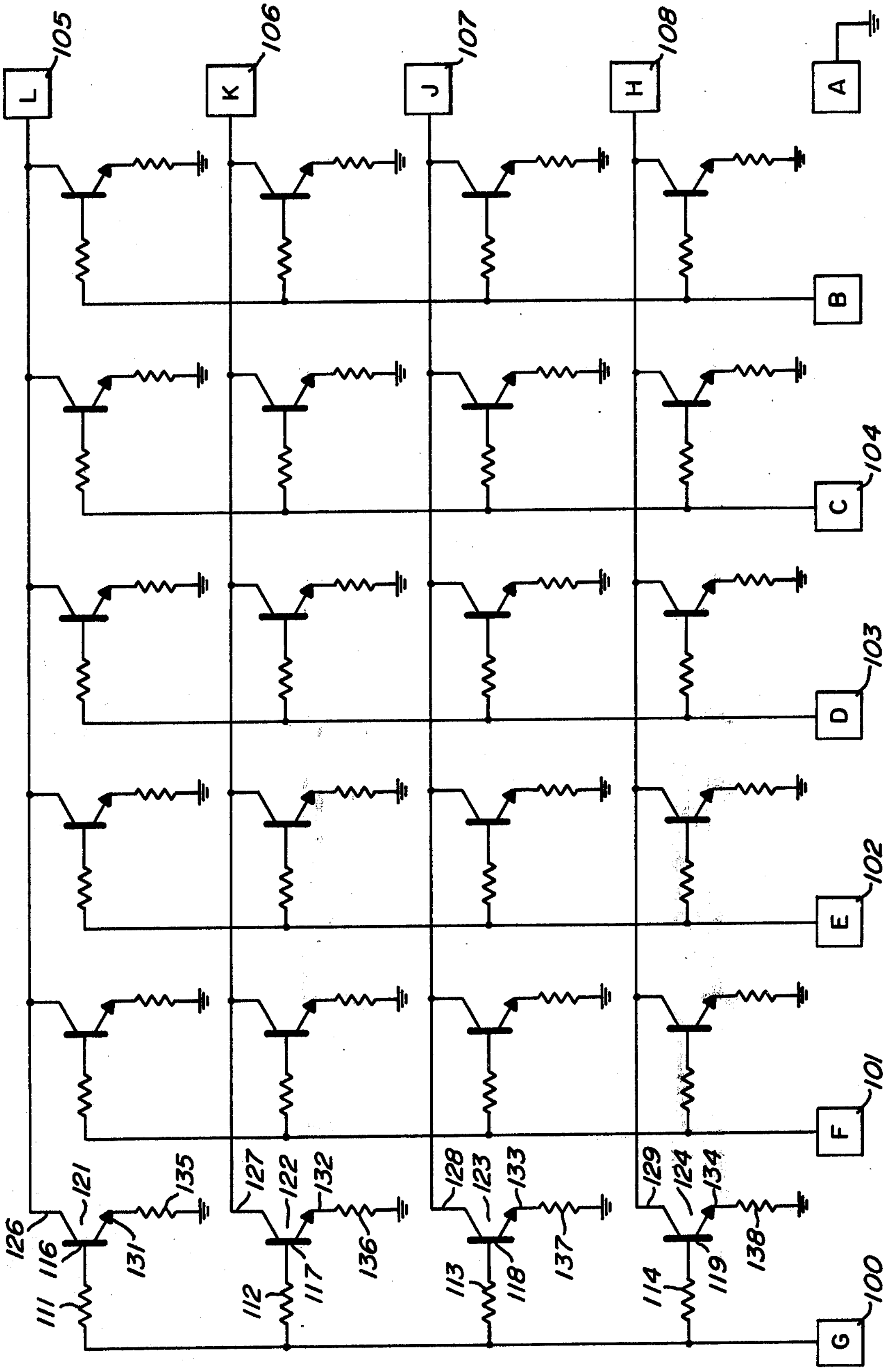
FIG. 3 is a schematic diagram of the electronically controlled code plug shown in FIG. 1.

Referring to FIG. 3, a schematic diagram of code plug 24 is shown. Input signals are coupled to input terminals 100 through 104 via leads 23, 28, 29, 30 and 31, respectively. The output terminals of code plug 24 are labelled 105, 106, 107 and 108. Each input terminal is connected to resistors that are in series with the base electrode of four transistors. The collector electrode of each of the four transistors is connected to one of output terminals 105 through 108. For example, input terminal 100 is coupled through resistors 111 through 114 to base electrodes 116 through 119 of transistors 121 through 124, respectively. Collector electrode 126 of transistor 121 is coupled to output terminal 105; collector electrode 127 of transistor 122 is coupled to output terminal 106; collector electrode 128 of transistor 123 is coupled to output terminal 107; and collector electrode 129 of transistor 124 is coupled to output terminal 108. Emitter electrode 131 through 134 of transistors 121 through 124 respectively are each coupled through a resistance element, 135 through 138, respectively, to ground potential. In the preferred embodiment, resistance elements 135 through 138 are 150 ohms. Each of the other four input terminals 101 through 104 are coupled to transistors which are coupled to output terminals 105 through 108 in exactly the same manner as described with respect to input terminal 100. Although the preferred embodiment is shown with the collector electrodes of the transistors coupled to the output terminals, the emitter electrodes coupled to ground potential, and the base electrodes coupled through resistors to the input terminal, is to be understood that other transistor configurations may be employed.

In operation, a 1 signal, for example, may be coupled from counter 21 via conductor 23 to input terminal 100. If each of transistors 121 through 124 are connected as shown in FIG. 3, they will each turn on in response to the "1" signal coupled thereto and develop a "0" signal at output terminals 105 through 108, respectively. If it is desired to provide a binary combination other than all 0's at output terminals 105 through 108 in response to a 1 at input terminal 100, transistors 121 through 124 may be programmed in order to provide this modified binary output. Transistors 121 through 124 may be programmed by disconnecting either the emitter electrodes from the emitter resistor connected thereto, fusing the emitter resistor, or disconnecting the collector electrodes from the appropriate output terminal. By programming each of the transistors to prevent it from switching on in response to a 1 signal coupled to input terminal 100, the particular output terminal connected to the disconnected transistor will remain at a 1 state when a 1 is coupled to input terminal 100.

In the preferred embodiment, code plug 24 is programmed before insertion into a paging receiver. It is placed in a special programming device and the particular binary signals which are desired at output terminals 105 through 108 in response to a 1 signal at terminal 100 are indicated on the programming device; then, current is passe through particular ones of transistors 121 through 124 in order to fuse particular ones of emitter resistors 135 through 138, and thus disconnect the emitter electrode of the appropriate transistor. For example, if an output code of 0101 is desired at output terminals 105 through 108, respectively, in response to a 1 signal at input terminal 100, emitter resistors 136 and 138 of transistors 122 and 124, respectively, are fused. Thus, when a 1 signal is coupled to input terminal 100, only transistors 121 and 123 will switch on and develop a 0 signal at output terminals 105 and 107, respectively.

Although the remaining transistor interconnections from input terminal to output terminal are not described, nor is the programming of these transistors described, it is to be understood that their interconnection, programming and operation are the same as the transistors connected to input terminal 100 and output terminals 105 through 108.

As can be seen, a switchable frequency active filter and tone detector is provided which is capable of providing a plurality of tone signal selections for each tone signal in the tone signal sequence in response to a single detection signal for a prior tone in the sequence. This is provided with a minimum of pins, terminal and wiring connections. An insertable and removable electronically controllable code plug is provided for selecting the tones in the sequence. The switchable frequency active filter and tone detector and the paging receiver in which it is employed, are capable of operating from a one cell battery, except for the active filter field effect transistor switches. Level shifting circuitry and logic circuitry are provided in order to operate the field effect transistors employed in the switchable active filter. The level shifting and logic circuitry is designed to require minimum power and current.

I claim:

1. A switchable frequency tone detector for receiving and passing a plurality of tone signal frequencies in sequence including in combination;

a one cell battery and a voltage converter providing an output voltage greater than the output voltage of said battery, active filter means including a plurality of field effect transistor switch means each operative in response to one of a plurality of particular control signals of a first predetermined voltage level greater than the voltage of said battery to determine a particular one of the plurality of tone signal frequencies said active filter means couples therethrough, detector means coupled to said battery and the output of said active filter means and operative in response to each of said tone signals in sequence being coupled thereto to develop a particular sequence signal, electronically controllable coding means coupled to said battery and said detector means and operative in response to each particular sequence signal to develop a particular group of binary signals at a second predetermined voltage level, lower than the output voltage of said battery, and converter means coupled to said battery, said voltage converter and said electronically controllable coding means and said switch means and operative in response to each of said particular groups of signals to develop one of said plurality of particular control signals, said converter means including level shifting means coupled to said electronically controllable coding means and operative in response to each signal of said particular group of binary signals to develop a second particular group of binary signals at the first predetermined voltage level and logic circuit means operative in response to each signal in said second particular group of signals at said first predetermined voltage level to develop said particular control signals.

2. The tone detector of claim 1 wherein said switch means includes said field effect transistor switches, impedance means coupled to said field effect transistor switches for determining a particular one of the plurality of tone signal frequencies said active filter means couples therethrough, said field effect transistor switches being operative to conduct in response to said control voltage and couple said impedance means to said active filter means, said field effect transistor switches having a low impedance when conductive due to said first predetermined voltage level of said control voltage.

3. The detector of claim 1 wherein said electronically controlled coding means includes matrix circuit means having a plurality of inputs coupled to said detector means and a plurality of outputs coupled to said converter means, said matrix circuit means being operative in response to each of said particular sequence signals coupled thereto to develop a particular group of binary signals.

4. The detector of claim 3 wherein said matrix circuit means includes a plurality of circuit elements each operable in response to said particular sequence signals coupled thereto to develop a binary signal in said group of binary signals, each of said circuit elements being programmable to enable operation in response to said particular sequence signals.

5. The detector of claim 4 wherein said circuit elements are transistors having base, emitter and collector electrodes.

6. The detector of claim 5 wherein one of said transistor electrodes are disconnected from said matrix circuit means to program same to enable operation.

7. The tone detector of claim 2 wherein one of said field effect transistor switches and said impedance means are coupled in series, said field effect transistor switches having a series impedance which varies in accordance with said first predetermined voltage level, said first predetermined voltage level being sufficient to maintain said series impedance below a first predetermined impedance.

8. The detector of claim 7 wherein said first predetermined voltage level is greater than 1.5 volts and said first predetermined impedance is less than 150 ohms.

9. The detector of claim 8 wherein said series impedance varies inversely with said first predetermined voltage level.

* * * * *